United States Patent [19]

Schumacher

[11] Patent Number: 4,857,366

[45] Date of Patent: Aug. 15, 1989

[54] METHOD FOR OBTAINING ADHESION OF URETHANE SEALANT TO A PAINTED OR GLASS SURFACE

[75] Inventor: Gerald E. Schumacher, Stillwater, Minn.

[73] Assignee: Minnesota Mining and Manufacturing Company, St. Paul, Minn.

[21] Appl. No.: 166,636

[22] Filed: Mar. 11, 1988

[51] Int. Cl.$^4$ .............................. B05D 3/10; C09J 3/14
[52] U.S. Cl. ................................ 427/302; 106/287.13; 106/287.16; 106/287.32; 156/329; 156/331.7; 252/184; 427/407.1; 427/407.2; 427/412.1
[58] Field of Search .................. 427/302, 407.2, 412.1, 427/407.1; 156/329, 331.7; 252/184; 106/287.13, 287.16, 287.32

[56] References Cited

U.S. PATENT DOCUMENTS

| | | | |
|---|---|---|---|
| 3,959,242 | 5/1976 | Watts et al. | 526/9 |
| 4,049,861 | 9/1977 | Norari | 427/407.2 |
| 4,409,266 | 10/1983 | Wieczorrek et al. | 427/302 |

*Primary Examiner*—Janyce Bell
*Attorney, Agent, or Firm*—Donald M. Sell; Walter N. Kirn; James V. Lilly

[57] ABSTRACT

A method is disclosed for treatment of a painted or a glass surface providing improved adhesion of a urethane sealant applied thereafter, comprising applying a solution containing p-toluenesulfonic acid, optionally an organofunctional silane, and an appropriate solvent to the painted or the glass surface, the painted surface being cured and devoid of a resin coating, and thereafter contacting the painted or the glass surface with the urethane sealant. A method for joining painted and glass surfaces using a urethane sealant is also disclosed. Compositions useful within these methods are also described.

26 Claims, No Drawings

4,857,366

METHOD FOR OBTAINING ADHESION OF URETHANE SEALANT TO A PAINTED OR GLASS SURFACE

TECHNICAL FIELD

The invention described relates to a method for treatment of a painted or glass surface so as to provide improved adhesion of a urethane sealant to such surface. It further relates to a composition utilized for treating a painted or glass surface.

BACKGROUND ART

Glass joined to automobile bodies becomes an important structural part of the automobile as a whole. For instance, windshields must support the roof of the automobile in cases of crashes or rollovers. A current technique for joining glass to a painted auto body utilizes a urethane sealant for attachment of the glass surface to the painted surface. However, recent changes in the composition of automotive paints have made it difficult to satisfactorily adhere urethane sealant directly to painted surfaces.

In order to obtain acceptable levels of urethane adhesion to painted auto body surfaces, application of a priming top coat (i.e., a resin, a primer or tie coat) to the painted surface has become mandatory. Therefore, the current methodology for original equipment manufacture and for some cases of glass replacement requires a preliminary step of applying a priming top coat onto both the painted surface and the glass surface prior to joining the surfaces with the urethane sealant. Only through use of such a priming top coat can satisfactory adherence of urethane and joinder of paint-glass surfaces be achieved.

More particularly, in the case of windshield or backlite installation, the urethane sealant described above is applied to a portion of the auto body that is designed to receive the glass, commonly known as the pinchweld. In new auto bodies the pinchweld is coated with one or more layers of automotive paint, which is typically "high solids" enamel paint. When urethane sealant is applied to a painted pinchweld, the maximum strength of the adhesive joint between the painted surface and the glass surface will be the strength of the weakest member of the joint (either an interface or the sealant). It is desirable that the interface adhesion strength (i.e., paint-urethane or glass-urethane) be greater than the cohesive strength (within the sealant) of the adhesive itself. Therefore, when testing is performed on paint-urethane-glass joints, cohesive failure is preferable to adhesive failure.

In general, urethane sealants experience adhesive failure if applied directly to a painted pinchweld. Current practices for auto glass installation require cleaning of the painted surface prior to applying a primer top coat that promotes bonding of a urethane adhesive to the painted surface. Due to the diversity of paints used to coat auto bodies and the fact that paint composition affects the adhesive qualities of polyurethane, a variety of primer top coats must be employed for installation of glass components.

Thus, there is a need in the art for a method for treating painted and glass surfaces which provides improved adhesion of a urethane sealant to such surfaces without application of a primer top coat. The present invention provides a composition and a method effective for such treatment.

SUMMARY OF THE INVENTION

The present invention discloses a method for treatment of a painted or a glass surface providing improved adhesion of a subsequently applied urethane sealant, comprising applying a solution of from about 0.25% to about 5% by weight p-toluenesulfonic acid, about 2.5% by weight organofunctional silane, and from about 92.5% to about 97.25% by weight of an appropriate solvent to the painted or the glass surface, the painted surface being cured and devoid of a resin coating, and thereafter contacting the painted or glass surface with an uncured urethane sealant.

Another aspect of the invention describes a method for treatment of a painted surface providing improved adhesion of a subsequently applied urethane sealant, comprising applying a solution of from about 0.25% to about 5% by weight p-toluenesulfonic acid and from about 95% to about 99.75% by weight of an appropriate solvent to the painted surface, said painted surface being itself cured and devoid of a resin coating, and thereafter contacting the painted surface with an uncured urethane sealant.

Yet another aspect of the invention relates to a method for joining a painted surface to a glass surface by means of a cured urethane sealant, comprising applying a first solution of from about 0.25% to about 5% by weight p-toluenesulfonic acid and from about 95% to about 99.75% by weight of an appropriate solvent to the painted surface said painted surface being cured and devoid of a resin coating; contacting the painted surface with an uncured urethane sealant; applying a second solution of from about 0.25% to about 5% by weight p-toluenesulfonic acid, about 2.5% by weight organofunctional silane, and from about 92.5% to about 97.25% by weight of an appropriate solvent to the glass surface; joining the glass surface to the uncured urethane sealant; and allowing the urethane sealant to cure.

A further aspect of the invention is a composition for treatment of a painted or a glass surface that provides improved adhesion of a urethane sealant thereto, comprising from about 0.25% to about 5% by weight p-toluenesulfonic acid, about 2.5% by weight organofunctional silane, and from about 92.5% to about 97.25% by weight of an appropriate solvent. In a preferred embodiment, the composition is about 1.0% by weight p-toluenesulfonic acid, about 2.5% by weight organofunctional silane, and about 96.5% by weight methyl ethyl ketone, isopropanol, or ethyl acetate.

A composition for treatment of a painted surface that provides improved adhesion of a urethane sealant thereto, comprising from about 0.25% to about 5% by weight p-toluenesulfonic acid and from about 95% to about 99.75% by weight of an appropriate solvent is also disclosed. In a preferred embodiment, this composition is about 1.0% by weight p-toluenesulfonic acid and about 99% by weight methyl ethyl ketone, isopropanol or ethyl acetate.

DETAILED DESCRIPTION OF THE INVENTION

In one embodiment of the present invention, a method for treatment of a painted or glass surface providing improved adhesion of a subsequently applied urethane sealant thereto includes the steps of applying a solution of from about 0.25% to about 5% by weight p-toluenesulfonic acid, about 2.5% by weight organofunctional silane, and from about 92.5% to about 97.25% by weight of an appropriate solvent to the painted or glass surface, and thereafter contacting the painted or glass surface with the uncured urethane sealant.

In a preferred embodiment, the appropriate solvent may be a ketone, an alcohol, or an aliphatic ester, with methyl ethyl ketone, isopropanol, and ethyl acetate particularly preferred.

In another preferred embodiment, the solution may be a mixture of about 1% by weight p-toluenesulfonic acid, about 2.5% by weight organofunctional silane, and about 96.5% by weight methyl ethyl ketone, isopropanol or ethyl acetate. Within the claimed invention, suitable organofunctional silanes include primary and secondary amino-organofunctional silanes and mercapto-organosilanes, with gamma-mercaptopropyltrimethoxysilane particularly preferred.

The present invention also provides a composition for treatment of a painted or glass surface that provides improved adhesion of a urethane sealant to both types of surfaces in the absence of a resin top coat on the painted surface. In a preferred embodiment, the composition is about 1.0% by weight p-toluenesulfonic acid, about 2.5% by weight organofunctional silane, and about 96.5% by weight of an appropriate solvent. Suitable solvents in this regard include ketones, alcohols, and aliphatic esters, with methyl ethyl ketone, isopropanol, and ethyl acetate particularly preferred. A composition containing about 1% by weight p-toluenesulfonic acid, about 2.5% by weight gamma-mercaptopropyltrimethoxysilane, and about 96.5% by weight methyl ethyl ketone, isopropanol or ethyl acetate is particularly preferred.

The omission of organofunctional silane from the above-described composition yields another claimed composition that effectively improves adhesion of urethane to painted surfaces. Similarly, elimination of silane from the solution of the previously described method for treatment of painted or glass surfaces leads to a method effective for the treatment of painted surfaces.

The compositions of the present invention may be applied to a surface coated with paint, either automotive, marine or appliance paint. In particular, the compositions may be used with the dried or cured "high solids" enamels currently utilized in the automotive industry. "High solids" enamels are known in the art, as exemplified by U.S. Pat. No. 4,297,448.

The claimed compositions may be wiped, sprayed or contacted by another means onto a painted or glass surface, and are effective when applied as a monomolecular layer. The application of large amounts of the compositions of the present invention is effective for adhesion of urethane, but is aesthetically unpleasing. Upon drying of the compositions, urethane sealant may be applied directly to the treated surface, eliminating the need for addition of a priming top coat prior to application of the urethane sealant. Urethane sealants are known in the art, as exemplified by U.S. Pat. Nos. 4,511,626 and 4,539,345. Suitable urethane sealants include one-part heat or moisture curable systems and two-part heat or chemically activatable polyurethane systems.

The methods of the present invention further provide the advantage of performing on all "high solids" automotive paints tested, in contrast to a single selected primer which often cannot be used on a wide variety of paint compositions. The methods for treating painted or glass surfaces disclosed herein may be used for both original and replacement glass installations utilizing urethane sealants.

The following examples illustrate the invention:

EXAMPLE 1

A mixture of 1.0% by weight p-toluenesulfonic acid and 99% by weight methyl ethyl ketone (1.0% pTSA-M) was combined in a glass jar. The solution was agitated at 22° C., and generally dissolved instantaneously. Methyl ethyl ketone (MEK) alone was used as a control. A cheesecloth dampened either with 1.0% pTSA-M or MEK was wiped on a surface coated with cured automotive paint. One half of the painted substrates thus prepared were further treated with a commercially available polyurethane primer top coat (Super Fast ™ urethane primer from 3M Company). When the primer had dried (about 5–10 min. at 22° C.), a bead of about 6.4 mm diameter uncured, one-part moisture curable polyurethane adhesive/sealant (Super Fast ™ urethane sealant from 3M Company) was applied to the cleaned or cleaned and primed surface. The urethane was allowed to cure at room temperature (about 22° C. and 40% relative humidity) for 7 days.

Adhesion of the cured sealant was determined by hand peeling the cured beads from the painted substrate and noting the type of bond failure. Table 1 shows the results of such determinations, and compares adhesion of urethane to painted surfaces treated with 1.0% pTSA-M or with MEK alone, in the presence or absence of primer.

TABLE 1

| Type of painted substrate | Without primer top coat | | With primer top coat | |
|---|---|---|---|---|
| | 1% pTSA-M | MEK | 1% pTSA-M | MEK |
| DuPont 707/3840 | coh (1) | adh (2) | coh | coh |
| DuPont 706/3840 | coh | adh | coh | coh |
| MetLAid 707/3840 (3) | coh | adh | coh | coh |
| MetLAid 706/3840 | coh | adh | coh | coh |
| PPG High Sol Enamel | coh | adh | coh | coh |
| PPG NED Enamel | coh | adh | coh | coh |
| PPG BC/CC (4) | coh | adh | coh | coh & adh |
| DuPont 27% lacquer | adh | adh | coh | coh |
| Chrysler lacquer | coh | adh | coh | coh |
| PPG DCT 8997/3000 | coh | adh | coh | coh |
| PPG High Sol 700 | paint (5) | paint | paint | paint |
| Inmont E58/E12 | paint & coh | adh | paint | adh |
| PPG UBC/URC 1000 | coh | adh | coh | paint |

TABLE 1-continued

| Type of painted | Without primer top coat | | With primer top coat | |
|---|---|---|---|---|
| substrate | 1% pTSA-M | MEK | 1% pTSA-M | MEK |
| Inmont E98/E14 | coh | adh | coh | adh |

(1) cohesive failure sealant
(2) adhesive failure of sealant to substrate
(3) Dupont paints applied by MetLAid, a "contract applicator"
(4) BC/CC = basecoat/clearcoat
(5) paint failure to paint primer As Table 1 demonstrates, adhesion of polyurethane sealant to both primed and unprimed surfaces was improved when the painted substrate was first treated with a 1.0% pTSA-M solution. Solvent alone (MEK) was not effective for adhesion of polyurethane to unprimed painted surfaces.

EXAMPLE 2

Solutions of p-toluenesulfonic acid (1%) mixed with a variety of solvents (99%) were tested according to the procedure described in Example 1. The painted surface used for testing was DuPont RK 3840 BC/CC; no primer was applied.

TABLE 2

| Solvent | Type of Failure |
|---|---|
| Isopropanol | coh |
| Toluene | adh |
| Xylene | adh |
| Ethyl acetate | coh |
| Water | adh |

Table 2 indicates that useful solvents within the present invention include those in which p-toluenesulfonic acid is soluble, such as alcohols, and aliphatic esters.

EXAMPLE 3

When urethane sealants are used to adhere glass to a painted auto body, the glass surfaces must also be cleaned prior to bonding with the polyurethane. Conventional aerosol foaming glass cleaners may be used for cleaning of the glass, but these cleaners do not improve the adhesion of polyurethane to glass. However, glass priming or preparatory solutions that contain an organofunctional silane have been found to improve the adhesion of urethane to glass. It would be useful to use one cleaning/preparatory solution for both painted and glass surfaces. To that end, a portion of the solvent component of the composition of the present invention was replaced with an organofunctional silane. The organofunctional silane may be a primary or secondary amino-organofunctional silane or a mercaptoorganosilane, or preferably mercaptopropyltrimethoxysilane.

Compositions were prepared according to the following formulations:

| Component | Formula A | Formula B |
|---|---|---|
| gamma-mercaptopropyl-trimethoxysilane | 2.5% | 2.5% |
| p-toluenesulfonic acid | 1.0% | 1.0% |
| Methyl ethyl ketone | 96.5% | — |
| Isopropanol | — | 96.5% |

The formulations A and B were tested according to the procedure of Example 1 for adhesion of urethane sealant to unprimed DuPont RK 3840 BC/CC paint and to plate glass. For comparative purposes, polyurethane beads were also applied to paint cleaned with MEK only and to glass cleaned with a conventional aerosol foaming glass cleaner. The results are presented in Table 3.

TABLE 3

| Solution | Substrate | Type of Failure |
|---|---|---|
| Formula A | Painted metal | coh |
| | Glass | coh |
| Formula B | Painted metal | coh |
| | Glass | coh |
| MEK | Painted metal | adh |
| Foaming glass cleaner | Glass | adh |

The data in Table 3 demonstrate that cleaning compositions containing an organofunctional silane yielded the desired cohesive failure of the urethane sealant itself, rather than the adhesive failure (sealant-paint or sealant-glass) observed with solvent alone or with a conventional glass cleaner.

EXAMPLE 4

Selected compositions were tested for glass to paint overlap shear strength, either after a 7-day cure at 22° C. and 50% relative humidity or after exposure to various environments. Briefly, 2.54 cm × 10.1 cm plate glass coupons were cleaned with conventional glass cleaner. A 0.64 cm diameter bead of silane-containing urethane sealant, described in U.S. Pat. No. 4,539,345, was applied across the width of one end of the glass. The urethane-beaded end was then overlapped about 1.9 cm with a 2.54 cm × 10.1 cm painted metal coupon that had been treated with one of the following solutions: 1.0% pTSA-M, MEK alone, p-toluenesulfonic acid (1.0%) in isopropanol (99.0%; p-TSA-I), or isopropanol alone (IP).

The glass-paint bonds were cured for 7 days at 22° C./50% relative humidity, and subjected to various environments. The bonds were then tested at about 22° C. using a Thwing Albert Intellect 2000 (Thwing Albert Instrument Co., Philadelphia, PA) at a crosshead speed of 12.7 cm per minute. Table 4 shows the results of such testing.

TABLE 4

| Environmental Exposure | Overlap Shear Strength (MPa) | | | |
|---|---|---|---|---|
| | pTSA-M[1] | MEK | pTSA-I[2] | IP[3] |
| None | 3.75 C | 0.88 AP | 3.06 C | 0.80 AP |

TABLE 4-continued

| Environmental | Overlap Shear Strength (MPa) | | | |
|---|---|---|---|---|
| Exposure | pTSA-M[1] | MEK | pTSA-I[2] | IP[3] |
| 7 days Sunlamp | 4.00 C | 2.29 AP | 3.94 C | 2.51 AP |
| 7 days 22° C. water soak | 3.89 C | 0.94 AP | 2.56 C | 0.96 AP |
| 7 days @ 38° C./100% RH | 3.91 C | 0.94 AP | 3.33 C | 1.16 AP |
| 3 days 22° C. water, plus 4 days @ 71° C. | 4.38 C | 1.21 AP | 2.79 P | 0.69 AP |

[1] 1.0% pTSA/99.0% MEK
[2] 1.0% pTSA/99.0% isopropanol
[3] isopropanol only
C = cohesive failure of sealant
AP = adhesive failure to paint surface
P = failure of paint to paint primer surface
RH = relative humidity Table 4 illustrates the superior overlap shear strength of the bonds applied to surfaces cleaned with solutions of 1.0% p-toluenesulfonic acid in either MEK or isopropanol, as compared to solvent alone. The superior overlap shear strength is also observed after exposure of the bonds to various environments.

EXAMPLE 5

A composition containing gamma-mercaptopropyltrimethoxysilane was also tested for overlap shear strength according to the procedure described in Example 4. The formulation was 10 parts p-toluenesulfonic acid, 25 parts gamma-mercaptopropyltrimethoxysilane, and 965 parts isopropanol. Both the painted surfaces and the glass surfaces were cleaned with this formulation. This protocol differs from that of Example 4, where a conventional glass cleaner was used for cleaning glass surfaces only. Glass to paint overlap shear strength was determined either after a 7 day cure at 22° C. and 50% relative humidity or after exposure to various environments. Table 5 illustrates the results of the experiment.

TABLE 5

| Environmental Exposure | Overlap Shear Strength (MPa) |
|---|---|
| None | 4.27 P |
| 7 days Sunlamp | 5.87 P |
| 7 days 22° C. water soak | 4.44 P |
| 7 days @ 38° C./100% RH | 4.08 P |
| 3 days 22° C. water, plus 4 days @ 71° C. | 4.52 P |

P = failure of paint to paint primer surface

These data show that the addition of an organofunctional silane to the solution of the present invention improves the overlap shear strength of the paint-urethane-glass bonds after exposure to all environments.

What is claimed is:

1. A method for treatment of a painted surface of a substrate or a glass surface so as to provide improved adhesion of a urethane sealant applied thereafter, comprising:
    applying a solution of from about 0.25% to about 5% by weight p-toluenesulfonic acid, about 2.5% by weight organofunctional silane, and from about 92.5% to about 97.25% by weight of a solvent selected from the group consisting of ketones, alcohols and aliphatic esters to the painted or the glass surface, the painted surface being cured and devoid of a resin top coating; and
    thereafter contacting the painted or glass surface with an uncured urethane sealant.

2. The method of claim 1 wherein the appropriate solvent is selected from the group consisting of methyl ethyl ketone, isopropanol, and ethyl acetate.

3. The method of claim 1 wherein the organofunctional silane is gamma-mercaptopropyltrimethoxysilane.

4. The method of claim 1 wherein the solution is about 1% by weight p-toluenesulfonic acid, about 2.5% by weight gamma-mercaptopropyltrimethoxysilane, and about 96.5% by weight isopropanol.

5. The method of claim 1 wherein the painted surface is coated with cured enamel paint.

6. The method of claim 1 wherein the uncured urethane sealant is a one-part heat or moisture curable system.

7. The method of claim 1 wherein the uncured urethane sealant is a two-part heat or chemically activatable system.

8. The method of claim 1 wherein the step of applying is performed by wiping the solution over the painted or the glass surface with a cloth.

9. The method of claim 1 wherein the step of applying is performed by spraying the solution over the painted or the glass surface.

10. The method of claim 1 comprising the further step of thereafter allowing said uncured urethane to cure.

11. A method for treatment of a painted surface of a substrate so as to provide improved adhesion of a urethane sealant applied thereafter, comprising:
    applying a solution of from about 0.25% to about 5% by weight p-toluenesulfonic acid and from about 95% to about 99.75% by weight of a solvent selected from the group consisting of ketones, alcohols and aliphatic esters to the painted surface, said painted surface being cured and devoid of a resin top coating; and
    thereafter contacting the painted surface with an uncured urethane sealant.

12. The method of claim 11 wherein the appropriate solvent is selected from the group consisting of methyl ethyl ketone, isopropanol, and ethyl acetate.

13. The method of claim 11 wherein the painted surface is coated with cured enamel paint.

14. The method of claim 11 wherein the uncured urethane sealant is a one-part heat or moisture curable system.

15. The method of claim 11 wherein the uncured urethane sealant is a two-part heat or chemically activatable system.

16. The method of claim 11 wherein the step of applying is performed by wiping the solution over the painted surface with a cloth.

17. The method of claim 11 wherein the step of applying is performed by spraying the solution over the painted surface.

18. The method of claim 11 comprising the further step of allowing said uncured urethane to cure.

19. A method for joining a painted surface and a glass surface comprising:
applying a first solution of from about 0.25% to about 5% by weight p-toluenesulfonic acid and from about 95% to about 99.75% by weight of a solvent selected from the group consisting of ketones, alchohols and aliphatic esters to the painted surface, said painted surface being cured and devoid of a resin coating;
contacting the painted surface with an uncured urethane sealant;
applying a second solution of from about 0.25% to about 5% by weight p-toluenesulfonic acid, about 2.5% by weight organofunctional silane, and from about 92.5% to about 97.25% by weight of a solvent selected from the group consisting of ketones, alchohols and aliphatic esters to the glass surface;
joining the glass surface to the uncured urethane sealant; and
allowing the urethane sealant to cure.

20. The method of claim 19 wherein the first solution is about 1% by weight p-toluenesulfonic acid and about 99% by weight methyl ethyl ketone, isopropanol, or ethyl acetate.

21. The method of claim 19 wherein the first solution is about 1% by weight p-toluenesulfonic acid, about 2.5% by weight organofunctional silane, and about 96.5% by weight isopropanol.

22. The method of claim 19 wherein the second solution is about 1% by weight p-toluenesulfonic acid, about 2.5% by weight gamma-mercaptopropyltrimethoxysilane, and about 96.5% by weight isopropanol.

23. A composition for treatment of a painted or a glass surface that provides improved adhesion of a urethane sealant applied thereafter, comprising:
from about 0.25% to about 5% by weight p-toluenesulfonic acid;
about 2.5% by weight organofunctional silane; and
from about 92.5% to about 97.25% by weight of a solvent selected from the group consisting of ketones, alchohols and aliphatic esters.

24. The composition of claim 23 wherein the appropriate solvent is selected from the group consisting of methyl ethyl ketone, isopropanol, and ethyl acetate.

25. The composition of claim 23 that is about 1% by weight p-toluenesulfonic acid, about 2.5% by weight organofunctional silane, and about 96.5% by weight methyl ethyl ketone, isopropanol, or ethyl acetate.

26. The composition of claim 26 wherein the organofunctional silane is gamma-mercaptopropyltrimethoxysilane.

* * * * *

UNITED STATES PATENT AND TRADEMARK OFFICE
CERTIFICATE OF CORRECTION

PATENT NO. : 4,857,366

DATED : AUGUST 15, 1989

INVENTOR(S) : GERALD E. SCHUMACHER

It is certified that error appears in the above-identified patent and that said Letters Patent is hereby corrected as shown below:

Column 5, line 6, "(1) cohesive failure sealant" should be

--(1) cohesive failure of sealant --.

Column 10, line 27 "claim 26" should be --claim 23--.

Signed and Sealed this

Twenty-first Day of August, 1990

Attest:

HARRY F. MANBECK, JR.

*Attesting Officer*  *Commissioner of Patents and Trademarks*